(12) United States Patent
Mantzel

(10) Patent No.: US 8,237,708 B2
(45) Date of Patent: Aug. 7, 2012

(54) DATA STRUCTURE REPRESENTING A PLENOPTIC FUNCTION VIA COMPRESSIBLE LAYERED ORTHOGRAPHIC PROJECTIONS FROM MULTIPLE ORIENTATIONS

(76) Inventor: William Edward Mantzel, Atlanta, GA (US)

( * ) Notice: Subject to any disclaimer, the term of this patent is extended or adjusted under 35 U.S.C. 154(b) by 1357 days.

(21) Appl. No.: 11/840,998

(22) Filed: Aug. 20, 2007

(65) Prior Publication Data

US 2008/0044078 A1 Feb. 21, 2008

Related U.S. Application Data

(60) Provisional application No. 60/822,828, filed on Aug. 18, 2006.

(51) Int. Cl.
*G06T 15/40* (2006.01)
(52) U.S. Cl. .......... 345/422; 345/419; 345/420
(58) Field of Classification Search .......... None
See application file for complete search history.

(56) References Cited

U.S. PATENT DOCUMENTS

| | | | |
|---|---|---|---|
| 5,529,070 A * | 6/1996 | Augustine et al. | 600/443 |
| 6,009,188 A | 12/1999 | Cohen | |
| 6,016,439 A * | 1/2000 | Acker | 600/411 |
| 6,097,394 A | 8/2000 | Levoy | |
| 2003/0001838 A1 * | 1/2003 | Han et al. | 345/419 |

OTHER PUBLICATIONS

C. Buehler, M. Bosse, L. McMillan, S. Gortler and M. Cohen, "Unstructured Lumigraph rendering", Computer Graphics (SIGGRAPH 2001), Aug. 2001, pp. 425-432.
J. Shade, S. Gortler, L.-W. He and R. Szeliski, "Layered depth images", Computer Graphics (SIGGRAPH'98), Aug. 1998, pp. 231-242.
P. Narayanan, S. Penta and S. Reddy K, "Depth+Texture Representation for Image Based Rendering", Indian Conference on Computer Vision, Graphics and Image Processing, Dec. 2004 (ICVGIP 2004).
C. Zhang and T. Chen, "A survey on image-based rendering—representation, sampling and pression", Signal Processing: Image Communication, vol. 19.1, p. 1-28, 2004, Elsevier.
H. Shum, S. Kang and S. Chan, "Survey of image-based representations and compression techniques", IEEE Transactions on Circuits and Systems for Video Technology, vol. 13.11, p. 1020-1037, 2003.

* cited by examiner

*Primary Examiner* — Said Broome

(57) ABSTRACT

A novel layered orthographic representation of the light field, comprising a set of 3-D orientations, each orientation having an associated depth direction and two sampling directions, each such orientation being associated with a set of planar grids normal to the depth direction and containing grid points evenly sampled along the sampling directions, each grid containing orthographic samples of the light field intercepting that grid point in the direction of the associated depth direction. Information of the geometric structure is similarly stored in depth field format at these sample points.

13 Claims, 5 Drawing Sheets

DATA STRUCTURE REPRESENTING A PLENOPTIC FUNCTION VIA COMPRESSIBLE LAYERED ORTHOGRAPHIC PROJECTIONS FROM MULTIPLE ORIENTATIONS

CROSS-REFERENCE TO RELATED APPLICATION

This application claims the benefit of U.S. provisional patent application Ser. No. 60/822,828, filed Aug. 18, 2006 by William Mantzel, which is incorporated herein by reference.

FIELD OF THE INVENTION

The present invention relates to the field of graphical imaging, and particularly image-based rendering. Specifically, it relates to the representation of light field information when information of the geometrical structure of the scene is available.

BACKGROUND OF THE INVENTION

In early computer vision and computer graphics approaches, environments were rendered visually by means of meshes constructed of polygons with individual properties of color and reflectance. In order to construct more photorealistic renderings, researchers soon began to explore ways to use the pixel values of actual images, giving rise to the field of image-based rendering. Some researchers explored ways to interpolate between images, while others explored methods for capturing and rendering the light field.

Circa 1996, Cohen et al. devised a light field representation (U.S. Pat. No. 6,009,188, hereinafter the "lumigraph" representation) that utilizes a cube surrounding an object. Each face on the cube has an associated set of points on that face. The light field is sampled on rays defined by combinations of 2 points, one from a given face on the cube and one point from the opposite face. This was one of the first approaches that sought a digital representation of the light field across a surface in free space, rather than the surface of the object. Furthermore, the lumigraph eliminated one of the redundant dimensions of the light field while noting that the luminance for a given light ray is constant along that ray in the absence of occlusions.

Shortly thereafter, Levoy et al. extended this idea to their representation (U.S. Pat. No. 6,097,394, hereinafter the "light slab" representation). While retaining the reduction of the redundant dimension, they showed that the pairs of planes whose combinations of points define the light rays comprising their light field representation need not be parallel, and may be arranged in any fashion. Furthermore they note that by placing one of the two planes at the horizon, that the light field may be represented via orthographic images.

These approaches overcome some of the limitations of the mesh representation. For example, rather than trying to model the Bi-Directional Reflection Distribution Function (BRDF) that may vary for each polygon of the mesh, these lumigraph and light slab representations are able to implicitly capture the reflectance information for the surfaces via actual images whose radiance information is interpolated and sorted into appropriate sample bins. Indeed, these representations are readily able to incorporate actual images from a scene provided that the vantage point of each image (or at least the transformation between image planes) is known. Furthermore, these approaches do not require the knowledge of the geometrical structure of the environment.

One potential limitation under the 4-dimensional representations of the lumigraph and light slab is that the spatial resolution and angular resolution are inextricably tied to each other. In particular, the sample spacing of the more coarsely sampled plane for a given pair of planes in the lumigraph representation (for example) will for the most part determine both the spatial and angular resolution. The spatial resolution will be on the order of magnitude of this coarser spacing, and the angular resolution will be on the order of the ratio of this coarser spacing to the distance between the planes. In many environments though, proper visual rendering requires much more spatial resolution than angular resolution, so it will in these cases be desirable to coarsely sample in the angular directions while sampling finely in the spatial directions.

Another potential limitation is the lack of locality of correlated samples, which may significantly limit the effectiveness of compression approaches. For example, a given point on a surface may have only a mild variation with respect to the angle in which it is viewed, giving rise to a number of correlated samples. However, these correlated samples may be very "far" apart with respect to their parametrization and many modern compression techniques that depend on local correlations may not be able to properly take advantage of this correlation.

Another consequence of this aforementioned lack of locality with respect to the (u, v, s, t) parametrization is that it will often be necessary to load the entire data structure into memory (or virtual memory). This in turn may limit the scale of the representation due to hardware limitations (or performance requirements).

It should be noted that some of these limitations only apply to the approximately lambertian environments, i.e. environments where the appearance of surfaces varies more spatially rather than with respect to the angle at which they are viewed. Although many environments fit this description, there are obviously some that don't. Furthermore, in the absence of geometric information (e.g. depth field data) from the scene, there is little reason to believe that these limitations can be improved upon (if these characteristics may even rightly be called limitations in this case). From another perspective though, this should provide a compelling reason to require and utilize such geometric information whenever possible.

This requirement of geometric information may seem at first glance overly restrictive. However, without such information the effective capture of the light field would require a number of samples on the same order of magnitude as the number of samples used in the 4-dimensional representation, and with so many samples it will often be possible to infer the geometric structure of the environment anyway.

On the other hand, when such geometric information is initially available it will often be possible to populate the 4-dimensional representation with finer spatial resolution than would otherwise be possible by exploiting correlations with respect to the viewing angle of a given point. A gantry apparatus would permit this representation to be more or less directly captured to obviate the need of such geometry-informed interpolation on the capture side. However, the act of rendering would still require interpolation, presumably from the local (nearest) samples, ignoring correlated nonlocal samples in the representation as discussed above.

SUMMARY OF THE INVENTION

According to the preferred embodiment of the present invention, the representation utilizes a collection of 3-dimensional coordinate systems, each having an inherent "depth" direction. For each coordinate system, the light field and depth field are then sampled in the direction of the depth vector on a 3-dimensional grid of points defined by a collection of rays parallel to the depth vector, and a collection of planes normal to the depth vector. Although the number of planes and rays are finite, it will be easy to expand such a representation augmenting it as additional information is obtained.

The representation seeks to decouple the spatial and angular parameters for the light field representation to allow coarse angular resolution while permitting fine spatial resolution. Although the representation may be considered inherently five-dimensional rather than four-dimensional, the two-angular dimensions may be sampled coarsely with only a few viewing directions. As such, it may alternatively be viewed as a finite collection of compressible 3-dimensional representations of the light field, each member of such a collection corresponding to a single direction of light. Even still, the representation may have many correlated and redundant samples when completely uncompressed, but will often have the potential to compress to an even greater degree than existing approaches (for equal degrees of representative fidelity).

The access of such information will be greatly facilitated by its locality and relatively small number of representative directions, so that new views may be quickly rendered. Furthermore, when a given spatial area is divided up into regions with multiple spatial scales with larger regions having lower spatial resolution, it will be feasible to quickly render nearby objects with a fine spatial resolution and faraway objects with a coarse spatial resolution, thereby overcoming a common limitation of using orthographic images for perspective rendering.

DETAILED DESCRIPTION OF THE INVENTION

Figure 1:
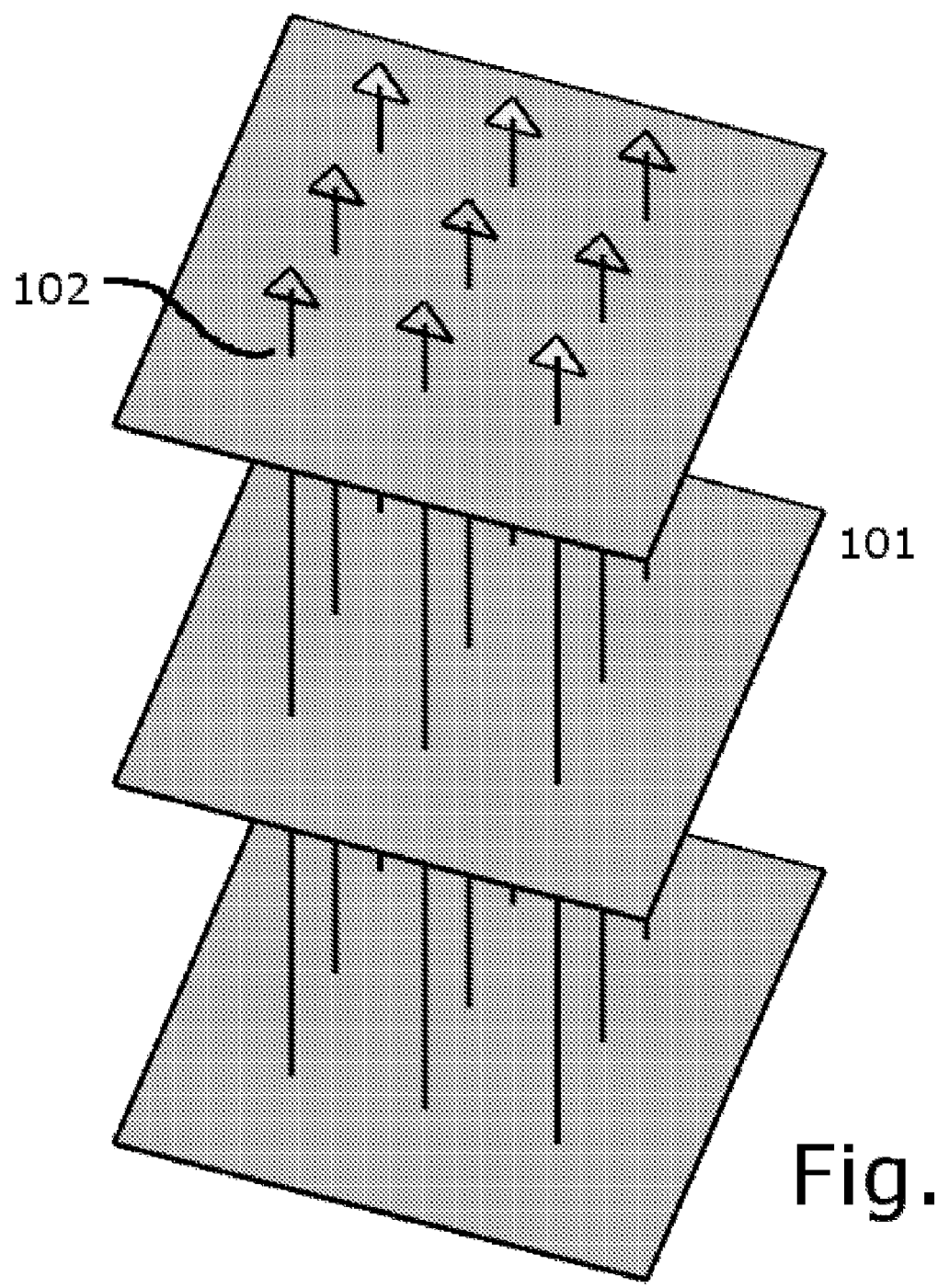
FIG. 1 illustrates the representation for a single coordinate system as the intersection of a set of parallel rays and a set of planes normal to those rays.

This invention essentially stores luminance information. The choice of representation for this light field information and depth field information constitutes the most substantial innovation described here. However, for illustrative purposes, the description will also discuss the user's choice of coordinate system, describe a scheme for partial compression, and give a cursory description of how rendering and other operations are facilitated is given to show how this choice of representation will be conducive for such operations.

A. Light Field Sampling

This light field representation is divided into a set of coordinate systems O for purposes of sampling. This set of coordinate systems is usually chosen to coincide at least partially with the inherent coordinate system of this region, e.g. the coordinate system of buildings and streets or the local direction of gravity. In coordinate system o, the 3-D coordinates of a given point are given as $\vec{X}_o = [x_o, y_o, z_o]$. It will be understood to one of ordinary skill in the art that the relation between the coordinates in coordinate system o and the common "world" coordinate system is determined in terms of the orthogonal rotation matrix $R_o$ and translation vector $\vec{T}_o$ that characterize coordinate system o in relation to the world coordinate system. This relation is given as follows:

$$\vec{X} = R_o \vec{X}_o + \vec{T}_o.$$

The translation vector $T_o$ gives the location of the local origin with respect to the world origin. The rotation matrix $R_o$ defines the "orientation" of coordinate system. In particular, the three columns in the $R_o$ matrix represent the three axes of the local coordinate system: the first two designated as spatial vectors (or sampling directions) and the third designated the depth vector. For the sake of discussion, terms such as "forward" will refer to the positive depth direction.

In each 3-D coordinate system o, there exists a set of planes normal to the depth vector which define the orthographic projection surfaces, i.e. $\{[x_o, y_o, z_o]: z_o = z_{oi} \in Z_o\}$ where $Z_o$ is the finite set of depths of planes for orthographic projections for coordinate system o. Also, each plane contains a set of associated planar samples $\{[x_{oj}, y_{oj}]\}_j$. For each jth planar sample on the ith plane, the light ray passing through $[x_{oj}, y_{oj}, z_{oi}]$ and parallel to the depth vector is sampled. In addition, the depth information $d_{oij}$ is stored, which represents the largest value of d such that the line segment from $[x_{oj}, y_{oj}, z_{oj}]$ to $[x_{oj}, y_{oj}, z_{oj}+d]$ does not pass through any occluding matter. For purposes of illustration, occluding matter is defined as matter emitting reflecting or absorbing a significant amount of light (usually this includes solid matter but not gas).

An alternative but equivalent description of the above is as follows. For each coordinate system given as above, there are an associated set of rays parallel to the depth vector. For every such jth ray, the light field value coincident with this ray is sampled at depth i. Furthermore, the depth value is stored which represents the distance along this ray from depth i to the nearest occluding matter in this direction.

Figure 2:
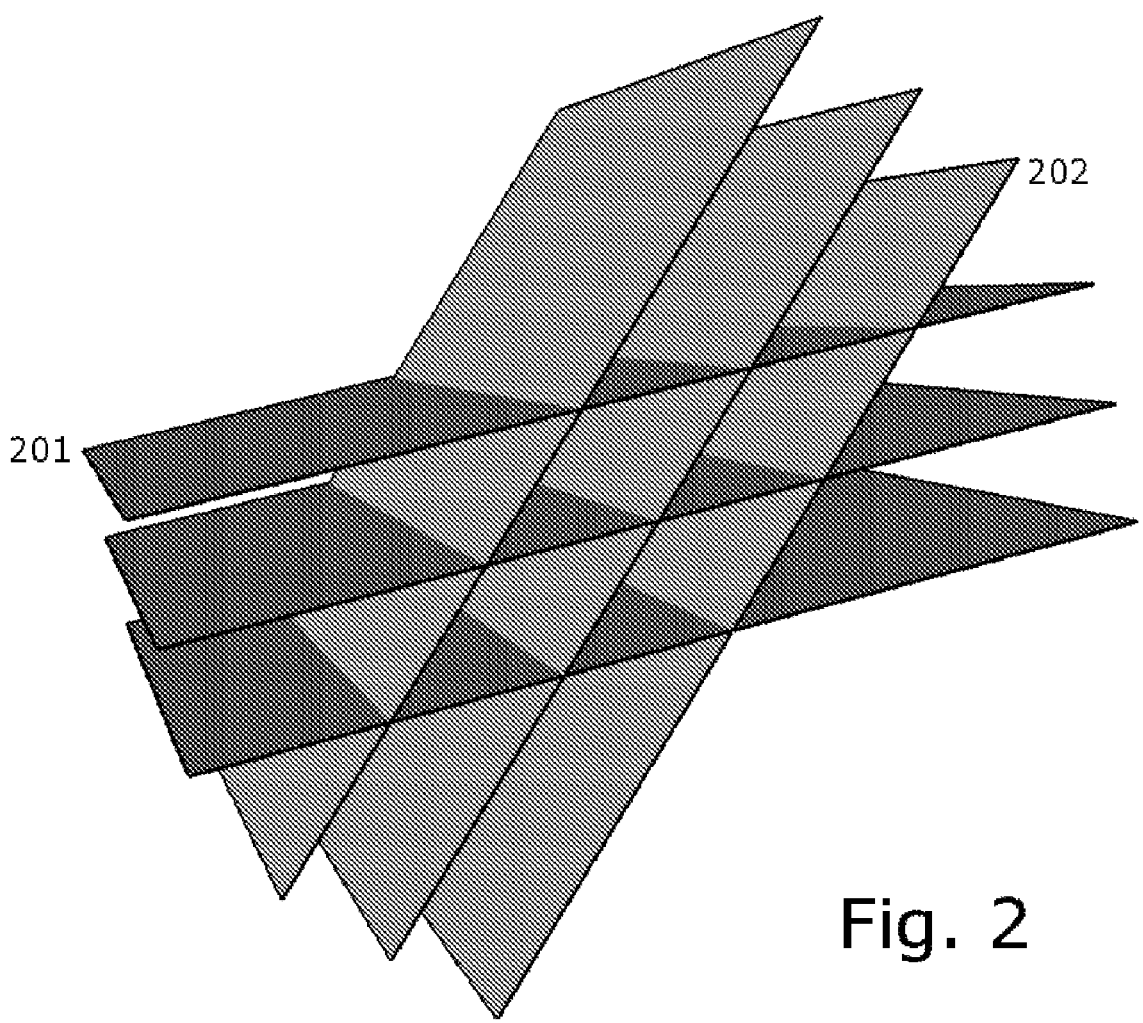
FIG. 2 illustrates several planes for two coordinate systems.

For example FIG. 1 shows several such planes (e.g. 101) normal to the inherent depth vector of the coordinate system, and several such rays (e.g. 102) parallel to this depth. FIG. 2 illustrates a plurality of coordinate systems, with several planes in one coordinate system (e.g. 201), and several planes in a different coordinate system (e.g. 202). Each plane for a given coordinate system is normal to the depth vector of that coordinate system.

For the sake of convenient and simple illustration herein, the "direction" of sampling is said to be in the direction of observation, though it will be understood to one of ordinary skill in the art that the direction of the incoming light is parallel but opposite to the direction of observation.

In a more specific version of the above embodiment, it may be efficient and useful to choose $Z_o = \{zD: z \in \mathbb{Z}\}$ and also to define the planar samples as $\{[xC, yC]: x, y \in \mathbb{Z}\}$. These sets are furthermore bounded over some region of space so that these sets are finite. Now, it is possible to define the light field information $f_o(x, y, z)$ and depth information $d_o(x, y, z)$ where x, y, z are represented as signed binary integers. Now for each coordinate system and corresponding inherent direction, the light field is sampled on a rectangular lattice. Note that the spatial resolution C need not be the same as the depth resolution D.

Figure 3A:
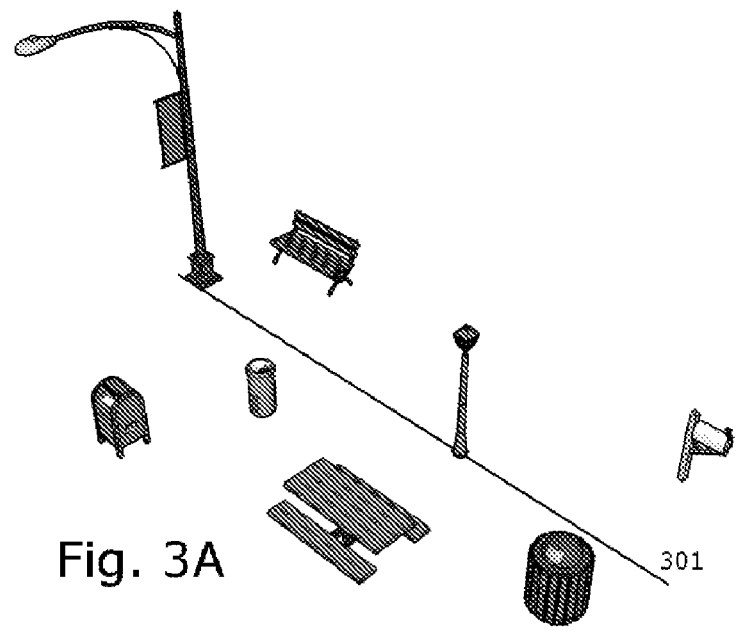
FIG. 3 illustrates the orthographic representation of a given scene for a given direction.
Figure 3B:
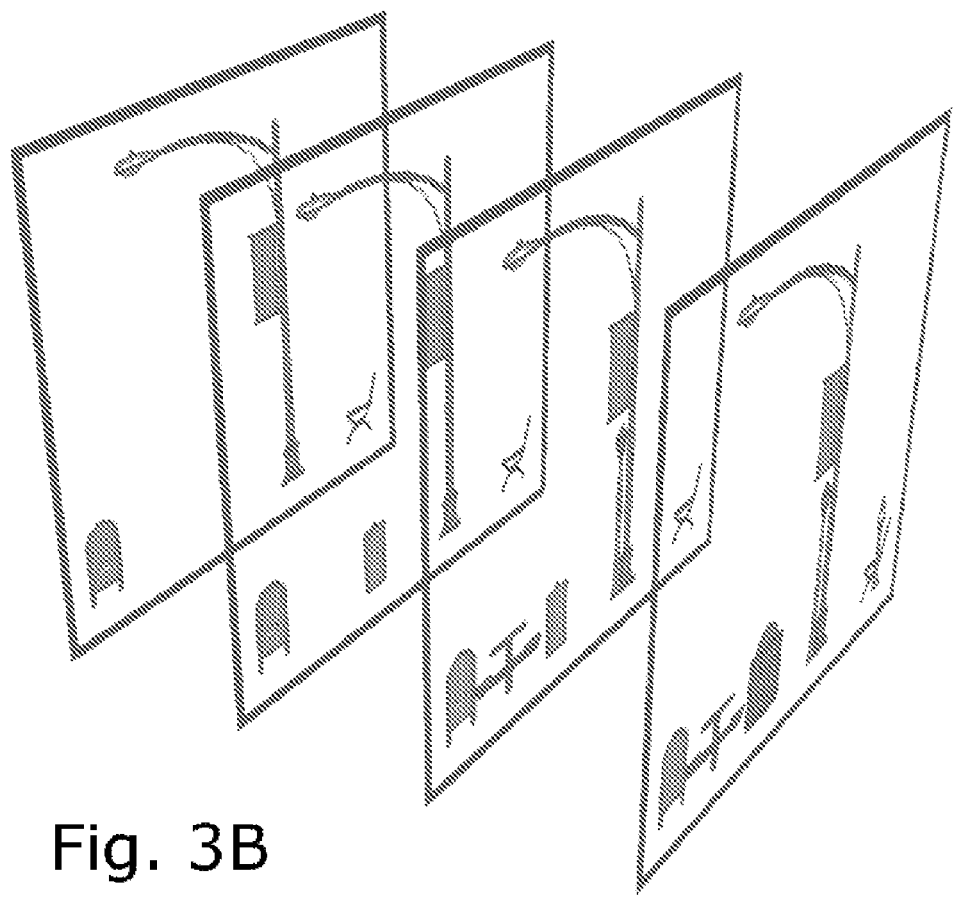

This representation is illustrated for a single coordinate system for the scene depicted in FIG. 3A for coordinate system with inherent depth axis 301. Shown in FIG. 3B are a layered set of orthographic images of this scene taken at various depths at planes normal to this depth direction.

It will be understood to one of ordinary skill in the art that the action of sampling the light field may be done with respect to some sampling function that effectively applies a spatial filter to the light field function before sampling at a point. For example, a light field may said to be sampled by obtaining CCD sensor measurements such that the light field is averaged over a given CCD area. Alternatively, the continuous light field function may be sampled with respect to the sinc basis which is equivalent to the action of anti-aliasing via low-pass filtering followed by point sampling. As such, any sampling over a given plane discussed herein may be performed with respect to a 2-dimensional sampling function. In the case of point sampling, this function is a 2-dimensional delta function.

Furthermore, although the light field function described herein is 5-dimensional and only depends on space and direction, it will be understood to one of ordinary skill in the art that this function furthermore depends on time and wavelength. Therefore, it is understood that the sampling for the described invention may be applied at any time and to any color. For example, the "red" luminance may be observed at a given point in a given direction via a camera with a "red" CCD element. Often the light field for an outdoor environment (for example) at a given time may be used to estimate the light field at another time by varying the luminance according to the ambient light for that other time of day.

Such sampling may be done with respect to another digital representation of the light field or means of digitally rendering arbitrary views of an environment. Alternatively, this light field sampling may be taken with respect to actual images, provided that depth information is also available for these images. In practice this depth information may result from a one of many solutions to the structure from motion problem currently known in the art. This solution often yields both the pose of the camera as well as the depth information from each pixel location in the direction of the corresponding ray.

Figure 4:
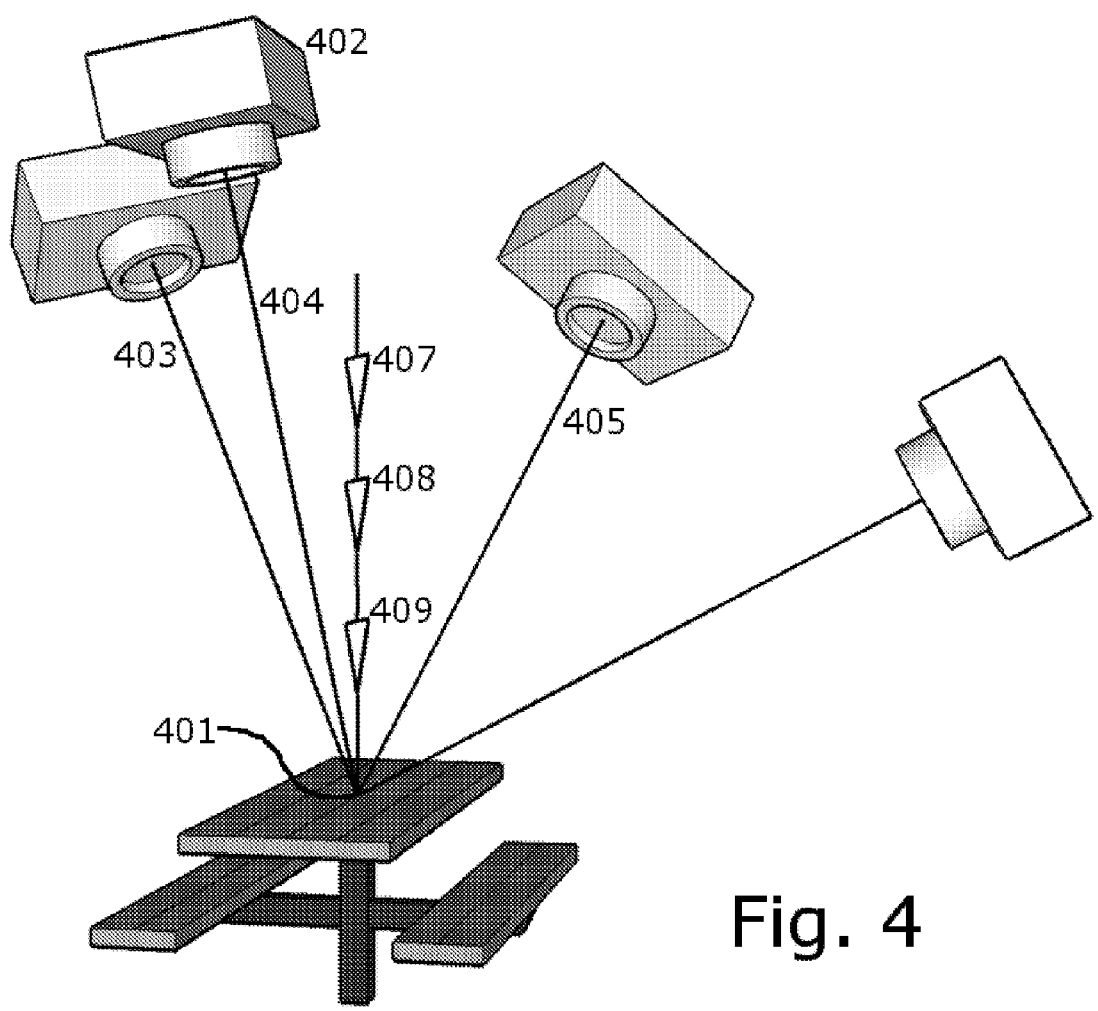
FIG. 4 illustrates the estimation of a light field sample via images with known depth information.

This process is depicted in FIG. 4. For a given point on a known surface 401 and a given image taken at a given camera pose (e.g. 402), one may utilize this pose and depth information to determine the region in the image corresponding to the ray between the camera's focal center and the point of interest. Then the image's pixel values can be used to compute the light field value for this ray, and several such rays 403 404 405 from many images can be used to estimate the ray of interest, applying the same resulting light field estimate value to samples at each depth 407 408 409 along this ray of interest. It may be desirable to use only such rays most similar to the ray of interest.

B. Coordinate Systems

In one embodiment of the representation, there is a common origin for all coordinate systems, so that all translation vectors $T_o$ are all equal to the defined local origin with respect to the world origin. Because the distinction between coordinate systems lies in their characteristic orientations, the terms "orientation" and "coordinate system" will be used interchangeably. Indeed, two representations utilizing the same set of orientations may be identical while having different translation vectors by choosing rays and planes appropriately. However, two representations with different sets of orientations must necessarily be distinct, regardless of choice of rays and planes. Furthermore, the terms "depth" and "plane" will be used interchangeably as well, as either one infers the other.

One specific such embodiment of the representation consists of 26 distinct orientations. These orientations are represented by the following rotation matrices:

$$R_k = R_y\left(k\frac{\pi}{4}\right)R_x(0) \quad (1)$$

$$R_{k+8} = R_y\left(k\frac{\pi}{4}\right)R_x\left(\frac{\pi}{4}\right) \quad (2)$$

$$R_{k+16} = R_y\left(k\frac{\pi}{4}\right)R_x\left(-\frac{\pi}{4}\right) \quad (3)$$

for k∈{1, 2, 3, 4, 5, 6, 7, 8} where $R_x$, $R_y$, and $R_z$ are functions of the Euler angles which yield their respective euler rotation matrices. $R_{25}$ and $R_{26}$ are given as respectively.

$$R_x\left(\frac{\pi}{2}\right) \text{ and } R_x\left(-\frac{\pi}{2}\right)$$

Consider the depth direction vectors for these 26 orientations (the 3rd column of each of the matrices), corresponding to the representative directions of light field. There is a special way that these vectors intersect the unit cube oriented with the world coordinate system and centered at the origin. In particular, these points of intersection create a uniformly spaced 3 by 3 lattice on each of the 6 faces. Such a choice of coordinate systems then yields a fairly even sampling of the light field. Indeed, any vector on the unit sphere is never more than 31 degrees away from at least one of these 26 representative depth vectors. However, there are vectors on the unit sphere that are no closer than 22 degrees from any of these representative depth vectors. For the sake of discussion the larger of these two characteristic angles will be referred to as the "angular spacing" for a given choice of representative depth vectors.

The mild inefficiency of this sampling pattern is reflected in the difference in these two characteristic angles. In fact, the more uniformly the sphere is sampled, the closer these two characteristic angles will be. Another choice of coordinate systems with a larger number n of orientations and corresponding vectors may yield even more uniform sampling patterns that come even closer to achieving the lower bound for angular spacing. This lower bound is given as a function of the number of representative vectors n as:

$$\theta(n) > C \cos^{-1}(1-2/n)$$

where θ(n) is the achievable angular spacing for n vectors and C is a constant slightly greater than 1 (approximately 1.2 for sufficiently large n).

This choice of the particular 26 orientations described in the above embodiment will likely be sufficient to accurately model environments whose surfaces can be approximately modelled as lambertian, e.g. when there is little variation with respect to the angle at which any given point on any given surface is viewed. It may even be possible to effectively use a 6-orientation representation with representative depth vectors parallel and opposite to each of the 3 world coordinate system axes.

In this way, the angular resolution may be fixed without limiting the spatial resolution. Indeed, the nature of the described representation allows either the spatial resolution or angular resolution of the light field to be enhanced as needed without affecting the other.

C. Compression

Because the data from each orientation will have a considerable amount of redundancy along the depth direction, there will be an opportunity to compress this data. One embodiment illustrates a simple sample elimination scheme that leaves at most $\log_2(n)$ samples for an original set of n redundant samples between occlusions along a given ray, and in some cases is able to eliminate all but one.

Although there is certainly a correlation between certain samples from various orientations, it will be challenging in many cases to account for such correlations for the purpose of compression, because of the irregular spatial relationship between samples from different orientations. Also, the potential for this kind of compression is necessarily limited by the number of orientations chosen, so in the cases when only a few orientations are used for the representation, there is little hope of achieving substantial inter-orientation compression anyway. For these reasons, compression will be performed for each orientation individually.

Consider the orientation o for the representation presented here. It will often be true that:

$$f_o(x,y,z) = f_o(x,y,z+1)$$

because both samples likely describe the same light that traveled between these two points. Also for the same reason it will often be the case that $$d_o(x,y,z) + D = d_o(x,y,z+1).$$

These characteristics will allow this representation to be greatly compressed because many of the depth and light field samples will be redundant.

It is primarily desirable to reduce these redundancies in the depth direction. However, it is also desirable to exploit correlations in the spatial sampling directions to further advance this compression. Furthermore, this method for compression should organize the resulting data to allow quick and efficient access.

Thus, the preferred approach for compression will seek to eliminate most of the redundant samples along the depth direction. However, it will also strive to leave the remaining samples in a small number of preferred planes of congregation in order to accommodate compression in the spatial direction. To this end, each depth shall be designated with a priority level, so that if the light field sample and depth field sample at this point are "deducible" from corresponding samples at a depth of higher priority on the same ray, the data from the depth of lower priority will be discarded.

A data sample is said to be "deducible" from a second data sample if the light and depth field data of the first data sample can be inferred from the light and depth field data of the second data sample. For example, if no occlusion exists between two points along the same ray and the point in front is of lower priority, then this lack of occlusion can be easily deduced from the higher priority depth field value, and the lower priority depth field value can be determined by subtracting the distance between these points from the depth field value of higher priority, and the light field values of the two samples will be the same. On the other hand, if the high priority sample was in front of the low priority sample, it might not be possible to determine whether or not occluding material exists between the two points.

One embodiment uses a natural choice to designate the priority level for each depth, the number of trailing zeros in the binary representation of the depth. In other words, this preferred integer depth is the depth the light ray passes through that has the greatest possible power of 2 in its factorization. In this way, the number of depths for a given priority level declines geometrically so that areas with large inter-occlusion distances tend to have many samples congregating on relatively few planes with spacing comparable to the inter-occlusion distance.

In order to keep track of which samples to keep and which samples should be discarded when eliminating redundancies along the depth direction, it may be useful to define a 3-D bit array for each orientation o as $b_o(x, y, z)$. This array will be 1 when the corresponding depth and light field samples are stored, and 0 when this sample is discarded. When the data is completely uncompressed, all samples are stored and $b_o(x, y, z)$ is 1 for all x, y, z.

An iterative procedure for compression is described in greater detail in the following Algorithm 1 for a given ray described by x and y. Here N is the number of bits used to represent the signed integers, and bit 0 is designated as the Least Significant Bit (LSB). This pseudocode will produce bit field $b_o(x, y, z)$ that will designate which samples are to be discarded and which samples are to be kept for given orientation o.

---
Algorithm 1 Depth-compression Pseudo-code

1: for n = 0 to N − 1 do
2:    for $z \in \{2^{n+1}k : k \in \mathbb{Z}\}$ do
3:       if $(d(x,y,z) + 2^n D == d(x,y,z + 2^n))$ then
4:          set $b(x,y,z + 2^n) = 0$
5:       end if
6:    end for
7: end for

---

There are some details to this algorithm. Clearly, there are bounds on the planes' depths. The if statement on line 3 only applies to depths that lie within the bounds of the representation, and generally only applies to samples that lie in free space.

In a potentially useful variation of this approach, the condition on line 3 is relaxed to furthermore include the condition when the distance d(x, y, z) and corresponding light field sample are unknown or when [x, y, z] is known to lie within a solid object or at a place where it is otherwise impractical or infeasible to define the luminance function. This variation will however require some additional bookkeeping though so that the decompression is feasible later.

Figure 5:
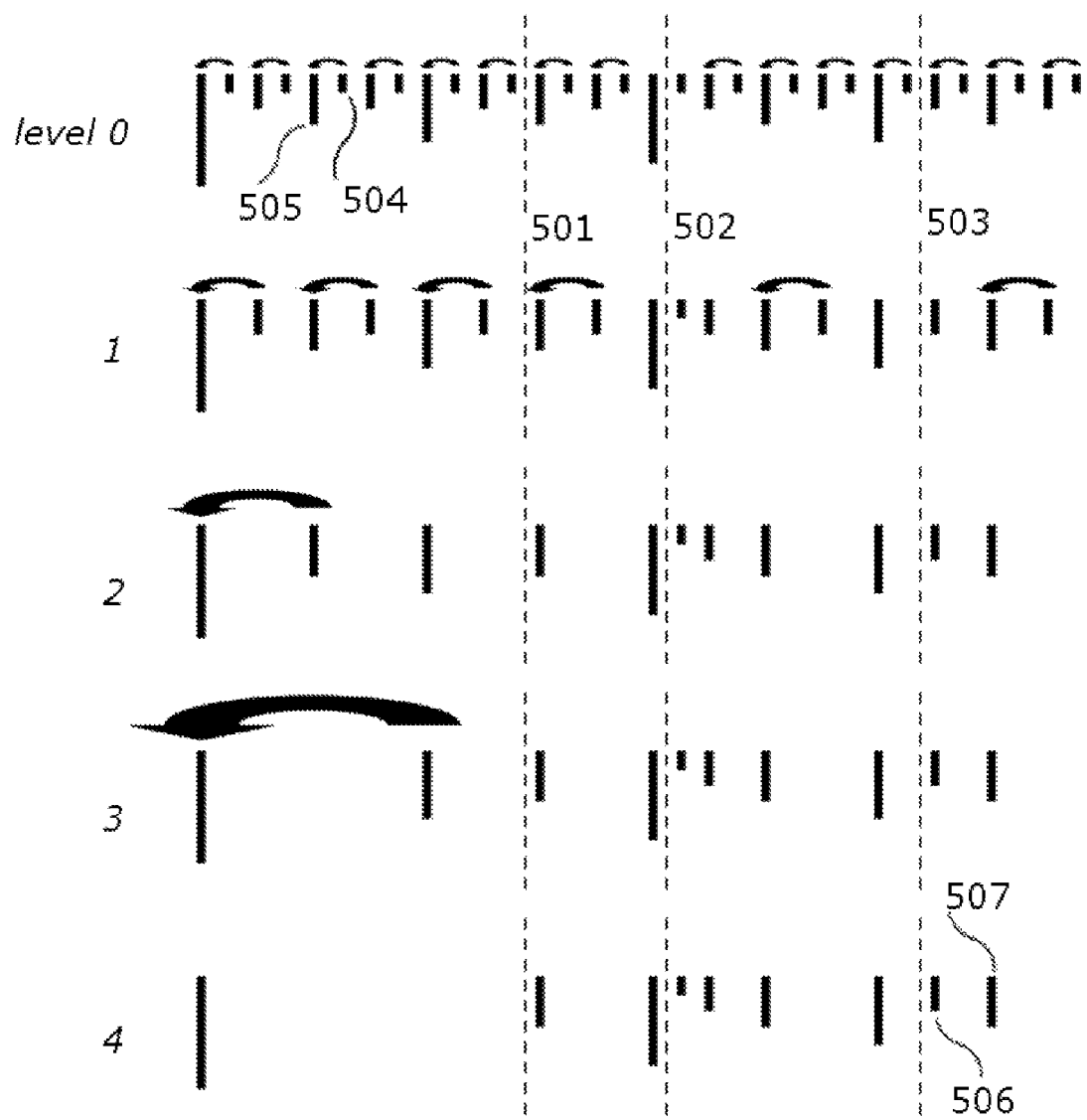
FIG. 5 illustrates eliminating redundant samples in the depth direction.

This described procedure has an analogy in terms of a the tick marks on a yardstick ruler as depicted in FIG. 5. For a given orientation o, consider the ray described by a given intercept [x,y] coordinate. Let the depth along this ray be denoted by a 5-bit binary representation. Each depth and corresponding sampling plane along this ray is designated by a tick mark whose height corresponds to the priority level (the number of trailing zeros of this depth). For example, 504 corresponds to a depth whose binary representation has no trailing zeros and 505 corresponds to a depth whose binary representation has two trailing zeros. The dotted lines 501 502 503 represent occlusions. For the sake of simplicity and illustration, these occluding objects all lie between adjacent sampling planes and do not pass through them. These occlusions partition this ray into contiguous regions of free space. The "forward" depth direction is to the right in the illustration so that each tick mark corresponds to light field information produced by the occlusion to the right of the tick mark.

The 5 levels depicted in FIG. 5 represent the iterations of k listed in the above pseudocode from 0 to 4. In particular, at each iteration all ticks with a given height corresponding to this priority level are eliminated provided that they are deducible from the larger remaining tick mark behind them (i.e.

provided that there is not occluding material between them). For example, the light field sample and depth field sample at depth 504 are eliminated because they are deducible from such samples at depth 505.

It may be preferable for a rendering application for the compression method to eliminate samples only at the first m priority levels, effectively designating priority levels greater than m exempt from elimination. Then, this representation is said to be m-level compressed or partially compressed. If permitted by memory constraints, storing the representation's data in this way may be desirable in order to facilitate faster rendering of an environment.

After these redundant samples have been eliminated, the remaining samples on each plane may lend themselves to image compression techniques such as JPEG 2000 or other multi-resolution approaches (e.g. wavelet compression). Many compression techniques will be able to effectively encode the remaining light and depth field samples jointly because the singularities (discontinuities) of the two will often coincide. Furthermore, the 3-D bit array itself will likely be very correlated and may lend itself well to run-length encoding.

Many modifications and improvements here will be apparent to those skilled in the art. For instance, if depth information is known in the "backward" direction as well as the "forward" direction, or if each orientation is paired to an orientation with a depth vector in the opposite direction, then it will be possible to deduce samples "behind" a given sample in addition to in "front" of it. In this case, it will be possible to remove all samples but one for each contiguous region of free space along the ray. For example, in FIG. 5, samples 506 may be removed if the depth information is known at sample 507 in the "reverse" direction as well as the "forward" direction.

D. Distributed Storage

In one potentially useful variation of the invention, a region of space for which the light field is captured is covered by many smaller subregions of space. These subregions need not be disjoint. In fact they may even be subsets of other subregions in some cases. They may even have the same coordinate system but with different choice of resolution for their constituent rays and planes. Each subregion of space has an associated representation with orientations chosen according to the inherent directions of that region of space. These representations may be stored in a distributed fashion where many users store one or more of the representative data objects. One use of this approach is to model a non-lambertian surface using a small subregion with a much greater number of orientations (higher angular resolution) than the neighboring subregions. Another use for this approach is to define a single large subregion with associated representation for features typically far away from an observer (e.g. clouds in the sky) that can be sampled at a much lower spatial resolution, and whose information can be shared between a multitude of neighboring subregions.

Under this distributed architecture, the aggregate size of the representative modelled region is not limited by a given users hardware, but rather is permitted to scale with the total number of participating users.

E. Access and Rendering

The organization of the described representation will help facilitate efficient access and rendering. The method of rendering a view from a given viewpoint may choose a subset of the orientations whose depth directions are most similar to the general viewing direction of the view to be rendered. The data associated with any one such orientation can be used to construct a portion of this view. Then, these view portions may be fused together as appropriate to construct the overall view.

With the described representation, it is possible to render a view portion for a given orientation o after accessing the light and depth field information from the so called "base" plane, defined as the plane normal to the depth vector, and having the same depth as the vantage point (i.e. a plane parallel to the orthographic planes and passing through the vantage point). The samples of this base plane may be queried from the orthographic plane immediately behind the base plane. If some of these samples have been eliminated by a compression scheme as above, these samples may be recovered by traversing successively to planes of higher priority (by clearing the first k bits from the base plane's depth for the kth iteration) until the appropriate data samples are found. Another embodiment of the invention queries the closest depth of priority level k to the depth of interest at the kth, but requires that one check the depth information to ensure that it is compatible with the sample point of interest. In other words, if the depth field information at this recovered sample in the direction of the sample of interest is less than the distance between this recovered sample and the sample point of interest, then there is an occlusion between the two points, and so this data is said to be incompatible, and the search must continue. This process at the kth iteration simply clears to zero the first k bits of the depth of interest, and sets to one the next most significant bit.

After this process is performed for each associated ray, these recovered depth field values will for the most part represent points on occluding matter whose depths are forward of the base plane, so that the recovered depth field values may be adjusted (i.e. referenced) to the base plane. However any represented points lying behind base plane should be eliminated and replaced by the light and depth field samples of the plane immediately in front of the base plane and then referenced to the base plane as before. Once all values are obtained relative to the base plane, the view portion may be rendered either by projecting each point individually to a given depth with finite thickness using its respective luminance value, or by rendering a continuous surface by interpolating the light and depth field values.

Because of the locality of the data and the natural relation between the viewpoint position and the planes that need to be queried, these view portions may be rendered quickly. Indeed, the number of planes which must be queried in the worst case scenario varies log-arithmically with the maximum depth field value to be retrieved in the above embodiment.

After constructing a given set of view portions, these view portions may be fused together to render the desired view. This act can be performed on a pixel by pixel basis by taking a weighted average of corresponding pixels of the view portions. These weights may be determined in part by the gradient of the depth field in the base plane, because a higher gradient usually corresponds to less reliable geometric information, and a very large gradient might indicate a discontinuity. Therefore, lower weights should generally be given to higher gradients, and no weight may be given to a gradient above a threshold. Such weights may also be determined in part by the angle between the depth vector of the orientation and the characteristic direction of the rendered pixel.

One potential limitation of an orthographic representation is the inherent oversampling for faraway surfaces in relation to the perspective view to be rendered. By defining large coarsely sampled subregions in addition to smaller more finely sampled subregions as above, it will be feasible to quickly render nearby objects with a fine spatial resolution and faraway objects with a coarse spatial resolution.

F. Conclusion

In this way described above, the described invention will provide enough information to allow a faithful rendering of the light field, while requiring samples at least quadratic and at most cubic in terms of spatial resolution with a minor overhead of the bitmap which is cubic in spatial resolution. In contrast, other 4-dimensional light field representations such as the lumigraph and light slab require samples whose dimensionality is quartic in terms of spatial resolution but gives comparatively much better angular resolution which necessarily increases as the spatial resolution increases. Furthermore, the described representation also effectively handles occlusions and allows for straightforward augmentation of this representation to a wider spatial region when needed.

Although the described representation has significant advantages over existing state of the art in some cases, there may be other cases when other rendering approaches will be more appropriate. For example, some surfaces may have a significant amount of variation with respect to their viewing angle. In such a case when the required angular resolution is comparable to the required spatial resolution (e.g. small shiny objects), the described approach will offer little if any advantage over existing approaches. Other objects such as trees or plants may have a geometrical structure that is too complex or irregular to explicitly model with a depth field. Such objects may then be better represented using other techniques that do not require a geometrical structure such as a depth map. Indeed, the described technique may be used in tandem with other light field representations seamlessly by fusing renderings from each of these techniques together as appropriate.

The aforementioned embodiments of the invention and illustrations are set forth only by way of example. Many modifications and variations will be apparent to those skilled in the art without departing from the spirit and scope of the invention. Accordingly, having shown and described what is at present considered to be several embodiments of the invention, it should be understood that the same has been shown by way of illustration and not limitation.

The invention claimed is:

1. A computer-implemented method for generating data samples of a light field function from a sequence of digital image frames representative of a scene comprising one or more objects, a plurality of pixels of said image frames furthermore having associated depth information, said method being performed by a computer processor, comprising the steps of:
the processor defining a plurality of coordinate systems, each coordinate system having: three orthogonal axes with one axis designated as a depth vector, a set of rays parallel to said depth vector, and a set of planes all normal to said depth vector, the intersections of said planes and said rays for each coordinate system defining a set of points;
for each coordinate system:
sampling the light field function and depth field function in the direction of said depth vector over said set of points via some subset of said plurality of pixel values and associated depth information.

2. The computer-implemented method of claim 1, wherein each plane for each coordinate system has a depth value associated with a priority level, further comprising the step of: compressing said data samples in each coordinate system for storage and/or transmission.

3. The computer-implemented method of claim 2, wherein said compressing comprises the step: eliminating light and depth field samples from a given ray whenever said samples are deducible from samples on said ray at a depth of higher priority, provided that certain depth priority levels may be designated as exempt from elimination.

4. The computer-implemented method of claim 3, further comprising the steps of: for a plurality of said planes, compressing the remaining samples using a multi-resolution technique for each such plane.

5. The computer-implemented method of claim 2, wherein said storage comprises the steps of: partitioning the set of coordinate systems; and storing the data associated with each member of the partition on a different computer.

6. The computer-implemented method of claim 1, wherein said data samples are chosen with respect to a bounded rectangular lattice in said planes, and said planes are uniformly spaced apart.

7. A non-transitory computer-readable medium storing a layered orthographic representation of the light field, comprising a set of 3-D orientations, each orientation having an associated depth direction and two sampling directions, being associated with a set of planar grids normal to the depth direction and containing grid points evenly sampled along the sampling directions, each grid containing orthographic samples of the light field and depth field intercepting that grid point in the direction of the associated depth direction.

8. A non-transitory computer-readable medium storing computer-executable instructions for causing a computer system programmed thereby to perform a method of generating data samples of a light field function from a sequence of digital image frames representative of a scene comprising one or more objects, a plurality of pixels of said image frames furthermore having associated depth information, comprising the steps of:
defining a plurality of coordinate systems, each coordinate system having: three orthogonal axes with one axis designated as a depth vector, a set of rays parallel to said depth vector, and a set of planes all normal to said depth vector, the intersections of said planes and said rays for each coordinate system defining a set of points;
for each coordinate system:
sampling the light field function and depth field function in the direction of said depth vector over said set of points via some subset of said plurality of pixel values and associated depth information.

9. The non-transitory computer-readable medium of claim 8, wherein each plane for each coordinate system has a depth value associated with a priority level, and wherein the method further comprises the step of: compressing said data samples in each coordinate system for storage and/or transmission.

10. The non-transitory computer-readable medium of claim 8, wherein each plane for each coordinate system has a depth value associated with a priority level, wherein the step of compressing comprises: eliminating light and depth field samples from a given ray whenever said samples are deducible from samples on said ray at a depth of higher priority, provided that certain depth priority levels may be designated as exempt from elimination.

11. The non-transitory computer-readable medium of claim 8, wherein the method further comprises the step of: for a plurality of said planes, compressing the remaining samples using a multi-resolution technique for each such plane.

12. The non-transitory computer-readable medium of claim 7, wherein said storage comprises the steps of: partitioning the set of coordinate systems; and storing the data associated with each member of the partition on a different computer.

13. The non-transitory computer-readable medium of claim 8, wherein said data samples are chosen with respect to a bounded rectangular lattice in said planes, and said planes are uniformly spaced apart.

* * * * *